United States Patent
Commins

[11] Patent Number: 5,984,217
[45] Date of Patent: Nov. 16, 1999

[54] BALE DISPENSER

[76] Inventor: James Arthur Commins, Aralven, Ensay, 3895, Australia

[21] Appl. No.: 09/146,490

[22] Filed: Sep. 3, 1998

[51] Int. Cl.[6] .................................................. B02C 19/12
[52] U.S. Cl. .............................. 241/101.4; 241/101.762; 241/605
[58] Field of Search ............................ 241/605, 101.762, 241/101.763, 101.4

[56] References Cited

U.S. PATENT DOCUMENTS

| | | | |
|---|---|---|---|
| 3,208,491 | 9/1965 | Bliss | 241/605 |
| 4,336,732 | 6/1982 | Liet et al. | 241/605 |
| 4,741,656 | 5/1988 | Bishop | 241/605 |
| 5,209,413 | 5/1993 | Dwyer et al. | 241/605 |

FOREIGN PATENT DOCUMENTS

| | | | |
|---|---|---|---|
| 224930 | 10/1959 | Australia | 241/605 |
| 1176958 | 10/1984 | Canada | 241/605 |
| 2601551 | 1/1988 | France | 241/605 |

*Primary Examiner*—Mark Rosenbaum
*Attorney, Agent, or Firm*—Rader, Fishman, Grauer & McGarry, PLLC

[57] ABSTRACT

A bale dispenser for dispensing hay or silage from a bale is disclosed which has a support table for receiving a bale. Drawing frame is engaged by a cable which is wound onto a winch and which in turn is driven by a motor. The cable draws the drawing frame to move a bale towards an end of the platform. Arranged at the end of the platform is cutting knife for slicing the bale and doffer elements which are rotated to break off biscuits of the hay bale as the hay bale is drawn past the knife. A storage frame is arranged adjacent to the support frame and includes a positioning frame movable from a generally horizontal position to an inclined position to roll a bale from the storage frame onto the support frame.

19 Claims, 6 Drawing Sheets

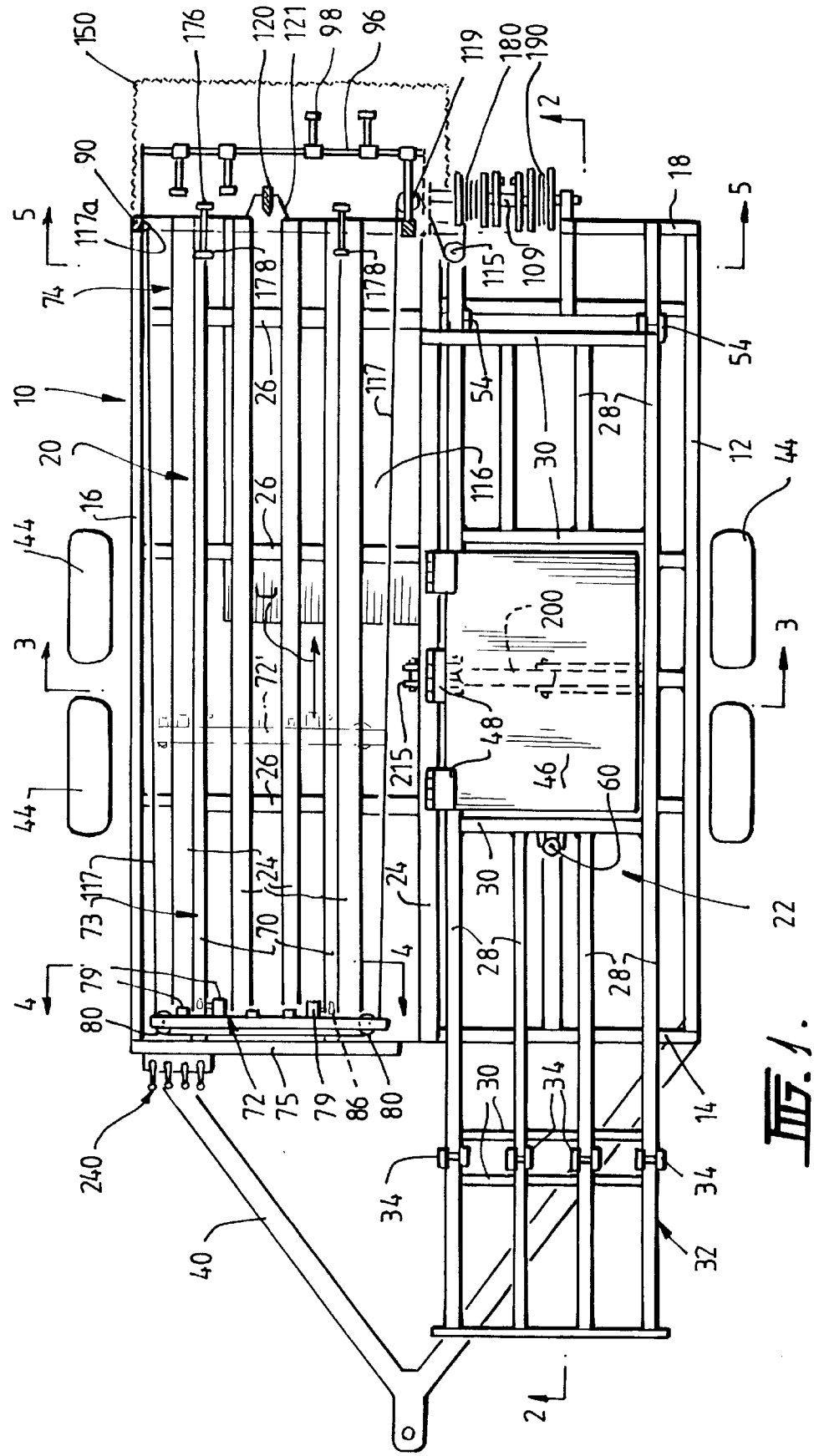

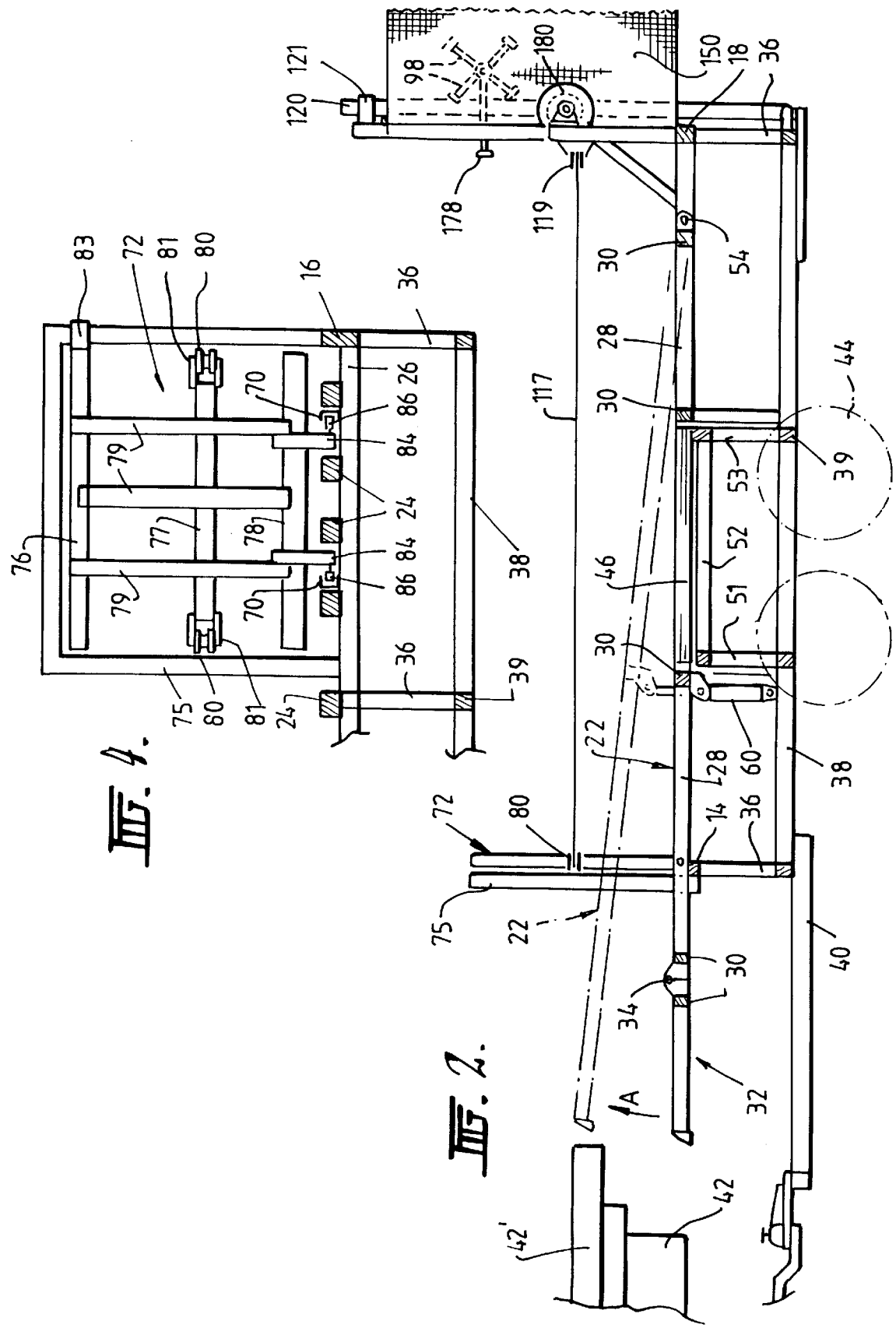

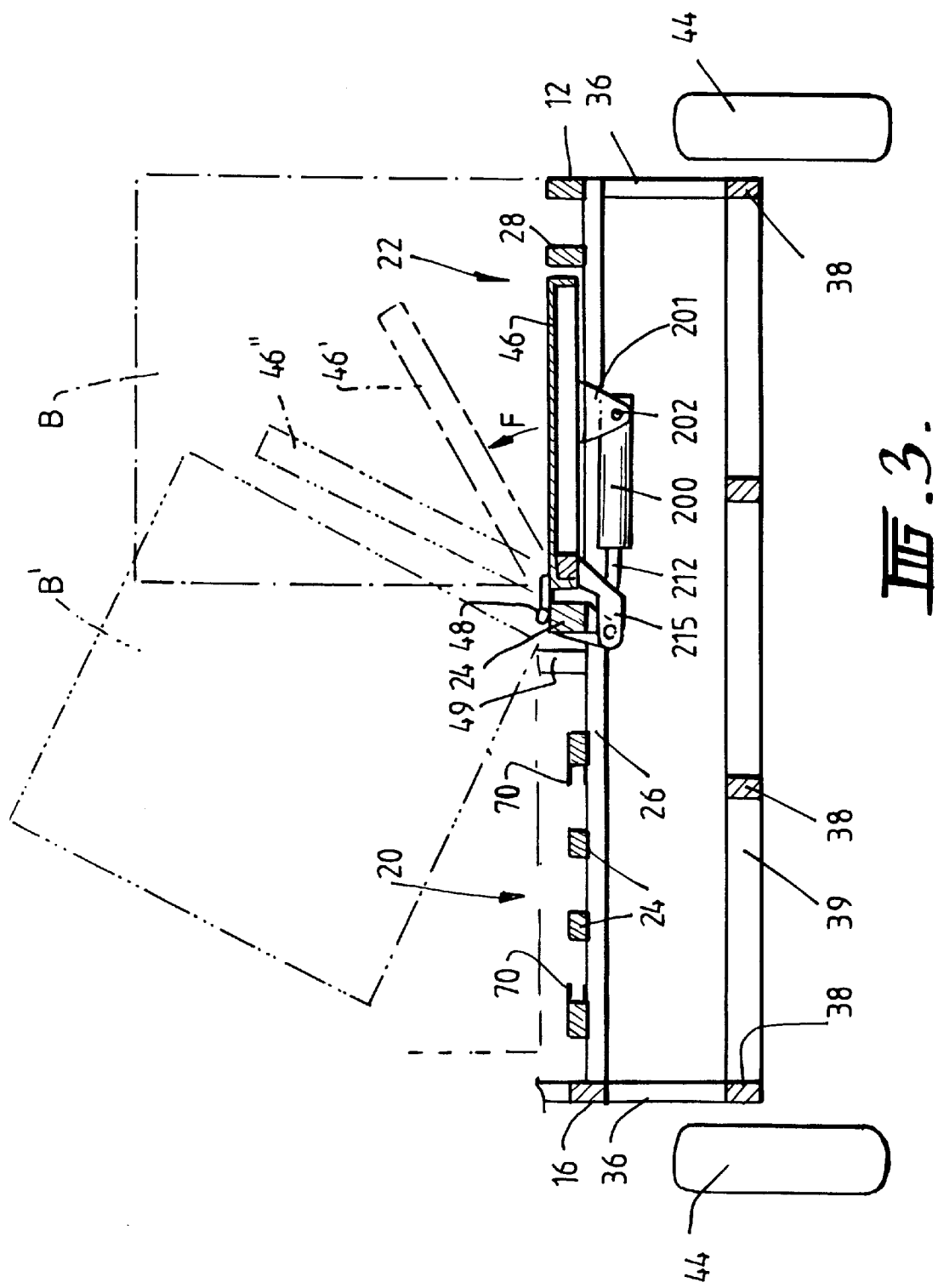

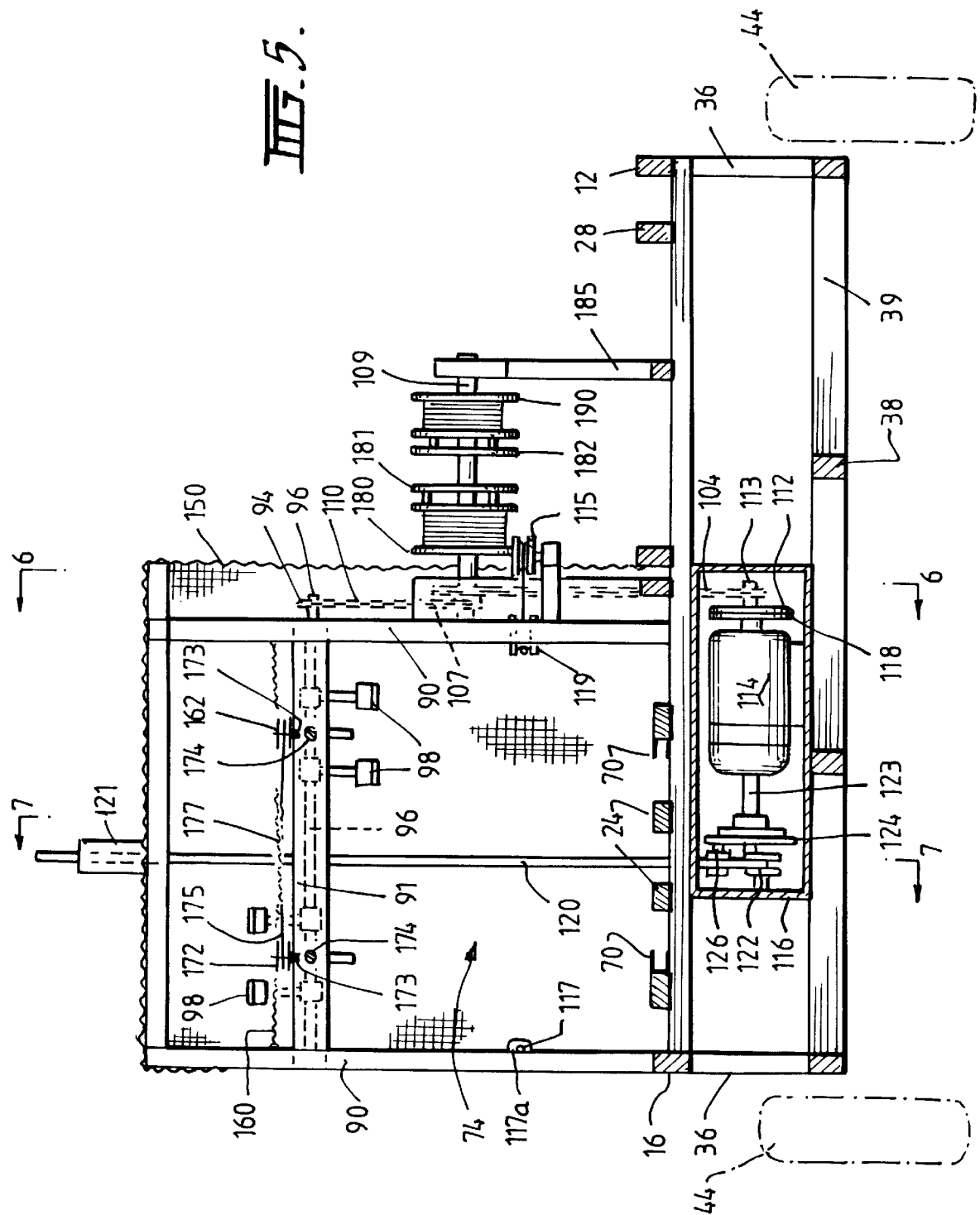

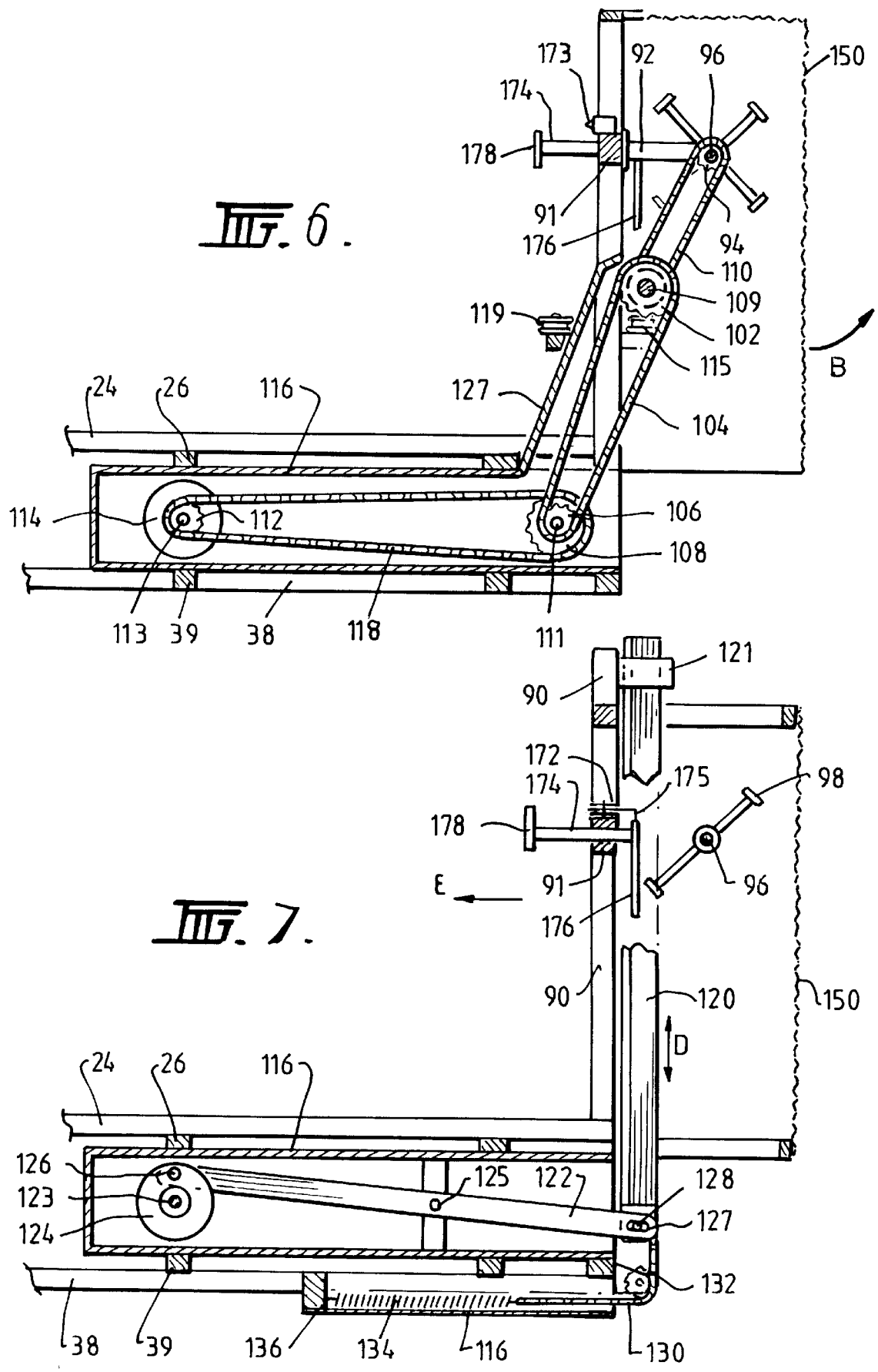

BALE DISPENSER

BACKGROUND OF THE INVENTION

1. Field of the Invention

This invention relates to a bale dispenser for dispensing hay or silage from a bale of hay or silage. The invention has particular application to the dispensing of lucerne hay for feeding cattle.

2. Related Art

Cattle are commonly fed from baled hay by transporting the baled hay to a paddock and dispensing the baled hay from the back of a trailer or tractor. Hay is generally dispensed manually with the use of a pitchfork or the like. However, some machines are provided for automatically dispensing the hay. However, particularly with the dispensing of lucerne hay, it is necessary that any automatic dispenser be rather gentle, otherwise leaves will be threshed from stems of the lucerne hay. This can result in the feed being unsuitable for feeding cattle and therefore of little use.

The object of this invention is to provide a machine for dispensing hay and, in particular, lucerne hay or for dispensing silage which can gently dispense the hay or silage.

SUMMARY OF THE INVENTION

Other objects, features, and advantages of the invention will be apparent from the ensuing description in conjunction with the accompanying drawings.

The invention may be said to reside in a bale dispenser for dispensing hay or silage from a bale, including:

a support member for supporting the bale;

bale moving means for moving the bale on the support member towards a dispensing end of the support member;

cutting means for slicing the bale as the bale is moved towards the dispensing end of the support member; and doffer means for breaking wads of hay or silage from the sliced bale as the bale is moved towards the dispensing end of the support member.

The combination of the slicing of the bale and the doffer means which breaks wads of hay from the bale results in rather gentle breaking of the hay out of the bale and therefore reduces threshing of the leaves from the stem of the hay. Thus, particularly with lucerne hay, the hay is deposited on the ground in wads without completely breaking and powdering of the leaves from the stems of the hay to ensure that the wads of hay are suitable for cattle feed.

Preferably the moving means comprises an abutment member guided for movement along the support member and for engaging the bale to thereby push the bale along the support member, and a cable for pulling the abutment member towards the dispensing end of the support member, and a winch for drawing in the cable to draw the abutment member and therefore the bale towards the dispensing end of the support member.

Preferably, the support member comprises a support frame including tracks for guiding the abutment member along the support frame.

Preferably, the cutting means is a knife arranged for vertical oscillating movement to slice the bale.

Preferably, the knife is coupled to a crank lever for oscillating the knife in the generally vertical direction.

Preferably the doffer means comprises a plurality of doffer elements arranged for rotary movement downstream of the knife so that the bale is first sliced by the knife and the sliced portions of the bale are brought into the path of the doffer elements which break wads of hay or silage from the sliced bale as the doffer elements rotate.

Preferably, the dispenser includes a storage section beside the support member for storing a bale of hay and bale positioning means for moving the stored bale of hay from the storage section onto the support member.

Preferably, the positioning means comprises a pivotally mounted tipping section for movement out of the plane of the support section to tip the bale from the storage section onto the support member.

Preferably, the storage section is tiltable in a vertical direction so that one end of the storage section can be raised to a suitable height for receiving a bale from a vehicle and then lowered to a storage and transport position.

Preferably, bale drawing means is provided for drawing the bale onto the storage section.

Preferably, the bale drawing means comprises a cable and winch arrangement so that the cable can be connected to the bale and the winch operated to pull the bale onto the storage section.

Preferably, the dispenser has bale holding means at the dispensing end for holding the sliced bale until the bale is struck by the doffer elements to break wads of hay or silage from the sliced bale.

Preferably, the dispenser is in the form of a towable trailer having wheels and a drawbar for enabling the dispenser to be towed behind a vehicle.

Preferably, a hydraulic motor is provided for rotating the doffer means and also for powering winches for drawing in the cable for moving the abutment member and the winch for drawing a bale onto the storage section.

A further aspect of the invention may be said to reside in a bale dispenser for dispensing hay or silage from a bale, including:

a support member for supporting the bale, the support member having a first end and a dispensing end;

hay or silage dispensing means at the dispensing end of the support member;

bale moving means for moving the bale between the first end and dispensing end and towards the dispending end so that the bale can be dispensed by the dispensing means;

a storage section for receiving a bale for storage; and bale positioning means for moving the bale from the storage section onto the support member.

Preferably, the positioning means comprises a pivotable frame member for pivotal movement out of the plane of the storage section for tipping the bale from the storage section onto the support member.

Preferably the dispensing means comprises a cutting knife and doffer means for breaking wads of hay or silage from a bale sliced by the knife as the bale is moved towards the dispensing end.

Preferably, the storage section is tiltable so as to raise one end of the storage section to a convenient height for receiving a bale from a vehicle for loading of the bale from the vehicle onto the storage section.

BRIEF DESCRIPTION OF THE DRAWINGS

In the drawings:

FIG. 1 is a plan view of a dispenser according to the preferred embodiment of the invention;

FIG. 2 is a view along the line 2—2 of FIG. 1;

FIG. 3 is a view along the line 3—3 of FIG. 1;

FIG. 4 is a view along the line 4—4 of FIG. 1;

FIG. 5 is a view along the line 5—5 of FIG. 1;

FIG. 6 is a view along the line 6—6 of FIG. 5;

FIG. 7 is a view along the line 7—7 of FIG. 5; and

DETAILED DESCRIPTION

Figure 8:
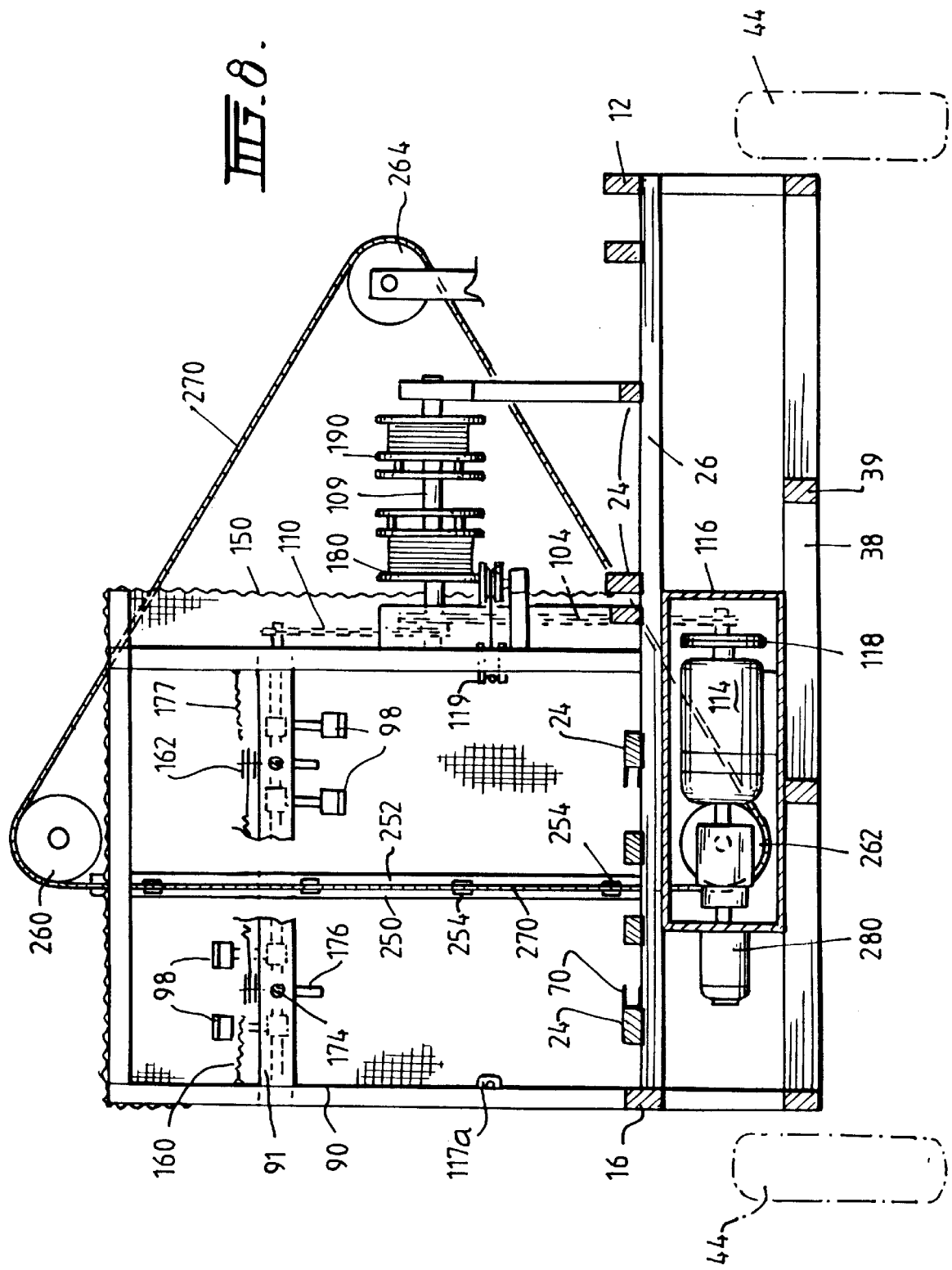
FIG. 8 is a view similar to FIG. 5 of a second embodiment.

With reference to FIG. 1, a dispenser 10 is shown which is generally in the form of a trailer comprised of a rectangular frame section 12, 14, 16 and 18. The trailer includes a support member 20 and a storage section 22.

The support member 20 includes a plurality of longitudinal frame sections 24 and transverse frame members 26. The storage section 22 includes longitudinal frame members 28 and transverse frame members 30. The support section 22 includes a hinged section 32 which is coupled to the remainder of the storage section 22 by hinges 34 which enable the section 32 to pivot from the position shown in FIG. 1 to a stowed position overlapping the remainder of the storage section 22 after a bale has been loaded onto the storage section 22 as will be described hereinafter so that the section 32 does not interfere with towing of the dispenser 10.

As best shown in FIG. 2, vertical frame members 36 and lower frame members 38 (only one shown in FIG. 2) support the frame members 24, 26, 28, and 30. A drawbar 40 is coupled to the frame members 38 for enabling the dispenser 10 to be towed behind a vehicle 42 (see FIG. 2). The dispenser 10 is supported on wheels 44 so that the dispenser 10 can be towed behind the vehicle 42.

The storage section 22 includes a stored bale positioning frame 46 which is pivotally coupled by hinges 48 to one of the frame members 24. As best seen in FIG. 3, the frame member 24 to which the positioning frame 46 is connected is slightly larger than the other frame members 24 and a stop 49 can be provided adjacent the hinges 48 for assisting in tipping of a bale from the storage section 22 onto the support member 20 as will be described in more detail hereinafter.

The chassis of the dispenser 10 may be completed by lower transverse frame members 39 and a support frame section formed from frame members 51, 52 and 53 may be provided beneath the positioning frame 46 for assisting in the support of the positioning frame 46 when in the lower position shown in FIG. 1.

The storage section 22 includes pivot hinges 54 for pivotally mounting the storage section 22 for pivotal movement in a vertical direction out of the plane of the paper in FIG. 1 relative to frame members 55, 56 and 57.

As best shown in FIG. 2, a hydraulic ram 60 is provided between lower frame member 38 and one of the frame members 30 of the support section 22 so that when the hydraulic ram 60 is extended, the support section 22 pivots about pivot hinges 54 in the direction of arrow A shown in FIG. 2 into an inclined position so that the end of the storage section 22 adjacent towbar 40 can be located at the height of a tray 421 of the vehicle 42 so that a bale can be easily moved from the vehicle 42 onto the storage section 22. Once the bale is located on the storage section 22, the ram 60 can be retracted so as to lower the storage section 22 back to the position shown in solid lines in FIG. 2.

As is shown in FIGS. 1, 2 and 3, two of the longitudinal frame members 24 are provided with C-shaped guide tracks 70 for guiding an abutment frame 72 from a forward end 73 of the dispenser 10 towards a rear dispensing end 74 of the dispenser 10. The forward end 73 of the support member 20 is provided with a fixed upstanding frame 75.

The abutment member 72 could comprise a solid plate or like member but in the embodiment shown comprises upper and lower frame sections 76, 77 and 78 which are coupled together by vertical frame member 79.

As is best shown in FIG. 4, the intermediate frame member 77 of the frame 72 supports a pair of guide rollers 80 supported in brackets 81. The upper frame member 76 may have an abutment plate 83 for contacting a microswitch to stop movement of the abutment frame 72 as will be described in more detail hereinafter.

The abutment frame 72 has a pair of downwardly extending legs 84 which carry roller wheels 86 which ride in the tracks 70 so that the frame 72 is guided for movement along the tracks 70. Thus, the frame 72 can move from the forward end 73 towards the rear end 74 by engagement of the wheels 86 rolling in the guide tracks 70.

The abutment frame 72 is moved by a cable 117 which is secured at one end, for example, at position 117a shown in FIG. 1 and which extends about the abutment frame 72 by being guided in the pulleys 80 about a pulley 119 at the discharge end 74 and about a second pulley 115 onto a winch 180. Thus, when the winch 180 rotates to draw in the cable 117, the abutment frame 72 is pulled in the direction of arrow C in FIG. 1 so that it will engage a bale (not shown in FIG. 1), loaded on the support member 20 and push the bale towards the discharge end 74. Reference numeral 721 in FIG. 1 shows the abutment frame part way along the support member 20.

With reference to FIGS. 5, 6 and 7, at the discharge end 74, a rectangular frame formed from frame section 90 is provided. A pair of rearwardly extending arms 92 extend outwardly from the vertical frame members 90 and support a shaft 96. Doffer elements 98 are welded onto the shaft 96 so that when the shaft 96 is rotated, the doffer elements will rotate about the longitudinal axis of the shaft 96. At one end of the shaft 96, a sprocket 94 is arranged for supplying drive to the shaft 96. The shaft 96 is supported in bearings or bushes (not shown) provided in the arms 92.

A winch shaft 109 is supported in bearings or bushes arranged in one of the vertical frame members 90 and a support frame member 185 (as is best shown in FIG. 5). The shaft 109 carries sprockets 102 and 107. A chain extends about the sprockets 107 and 94 and a further chain 104 extends about the sprocket 102 and a sprocket 106 mounted on a journalled shaft 111. The shaft 111 carries a further sprocket 108. A motor 114 (see FIG. 6) is provided and on its output shaft 113 carries a sprocket 112. A chain 110 extends about the sprocket 112 and the sprocket 108 so that when the motor 114 is operated, drive is transmitted via the sprocket 112 to the chain 110 and then to the sprocket 108. The journalled shaft 111 is rotated by the sprocket 108 and drive is transmitted via the sprocket 106 to chain 104 to in turn drive sprocket 102. The driving of sprocket 102 will also rotate sprocket 107 on winch shaft 109 to transmit drive via chain 110 to sprocket 94 for driving the shaft 96.

A winch 180 is provided for receiving the cable 117 and the winch 180 has a clutch plate 181 which is locked onto the shaft 109 and which may be selectively engaged with or disengaged from the winch 180 so as to selectively cause the winch to rotate or remain stationary when the shaft 109 is rotated. The clutch plate 181 and winch arrangement 180 is known and therefore will not be described in greater detail other than to say that the plate 181 has pins which can be locked with the winch 180 so that drive is transmitted from the shaft 109 to the plate 181 and to the winch 180 when the plate 181 is locked to the winch 180. A second winch 190 is also provided with a clutch plate 182 which is mounted on the shaft 109 and which can be engaged with the second winch 190 for selectively driving the second winch 190 in the same manner as the first winch 180.

As is best shown in FIG. 5, the motor 114 has a second output shaft 123 which extends outwardly on the opposite side of the motor 114 to the shaft 113. The output shaft 123 carries a disc 124 which is coupled to a lever 122 via an eccentrically arranged pin 126 on the disc 124. The lever 122 is pivoted on a pin 125 and forms a crank lever for engaging a knife blade 120 via a slot 127 in the lever 122 and a pin 128 on the knife blade 120. The knife blade 120 is arranged vertically and is guided in a bracket or bush 121 on upper frame member 90. The knife blade 121 has a chain 130 coupled to its lower end which is guided about a sprocket 132 and the chain 130 is connected to a spring 134 which is anchored at end 136. Thus, when the motor 114 is rotated, the disc 124 rotates so that the crank lever 122 oscillates up and down in seesaw fashion about pivot pin 125 to cause the blade 120 to oscillate vertically in the direction of double-headed arrow D in FIG. 7. The chain 130 and spring 134 provide balance to the blade 120 to pull the blade vertically downwards during the half cycle of the disc 124 when the pin 126 is to the right of a vertical radial line of the disc 124 in FIG. 7 to ensure smooth oscillating movement of the knife blade 120 in the direction of double-headed arrow D in FIG. 7.

A pair of holders 174 is mounted through a frame member 91 which extends between the vertical frame members 90. Each holder 174 is slidable through a bore through the frame member 91 and has a holder rod 176 on its rearward most end and an abutment rod 178 on its opposite end. One of the rods 176 has a cable 175 which is guided around a pulley 172 and is then connected to a spring 175 which is anchored to one of the vertical frame members 90 for biasing the rod 176 in the direction of arrow E in FIG. 7. The other of the rods 176 also has a cable 175 which is guided about a pulley 162 and is connected to a spring 160 which is anchored to the opposite vertical frame member 90 for biasing that rod 176 also in the direction of arrow E.

As best shown in FIG. 3, a hydraulic cylinder 200 is pivotally coupled to the bottom of positioning frame 46 by a bracket 201 and pivot pin 202 and has its rod 212 pivotally connected onto a bracket 215. When the cylinder 200 is extended, the positioning frame 46 is pivoted in the direction of arrow F about pivot hinges 48 through the position shown by reference 461 to the position shown by reference 4611 in FIG. 3 to move a bale B from the storage section 20 onto support member 20 by tipping the bale B over as shown by reference B' in FIG. 3. The stop post 49 assists tipping of the bale B when the positioning frame 46 is pivoted into the position shown by reference 4611 in FIG. 3.

Thus, a bale may be loaded from the vehicle 42 onto the dispenser 10 by first pivoting the storage section 22 about pivot hinges 54 by operation of hydraulic ram 60 to tilt the storage section 22 in the direction of arrow A so as to align the section 22 with tray 421 of the vehicle 42. Cable 119 from winch 190 may then be drawn out from the winch 190 and secured to a bale (not shown) on the vehicle 42. The clutch plate 182 can then be engaged with the winch 190 so that when the motor 114 is operated and drive is transmitted to winch shaft 109, the winch 190 is rotated to draw in the cable 119 so that the bale is pulled off the vehicle 42 onto the storage section 22 and into position generally in alignment with the support member 24. The motor 114 can then be stopped and the plate 182 disengaged from the winch 190 so that when the motor 114 is again activated, the winch 190 is not rotated. A microswitch (not shown) is provided at the rear dispensing end 74 of the storage section 22 so that if the bale is pulled too far by the winch 190, the bale will contact the microswitch and this will cause the motor 140 to automatically shut off.

The hydraulic ram 200 shown in FIG. 3 may then be operated to pivot the positioning plate 46 so that the bale B (see FIG. 3) which has been drawn onto the storage section 22 is tipped from the storage section 22 onto the support member 20. If it is desired to immediately load another bale from the vehicle 42 onto the storage section 22, the winch 190 can again be utilized to draw the new bale onto the storage section 22 ready for transfer to the support member 20 after the bale on the support member 20 has been dispensed.

In order to dispense the bale which is now loaded onto the support member 20, the clutch plate 181 is engaged with the winch 180 and the motor 114 is activated so that drive is again transmitted to the winch shaft 109 to cause the winch 180 to rotate. Rotation of the winch 180 will draw in cable 117 which will pull abutment frame 72 from the front end 73 towards the rear end 74 thereby pushing the bale towards the rear end 74. The motor 114 will also transmit drive to the doffer elements 98 via the chain 100 and sprocket 94 so that the doffer elements 98 are rotated about the axis of shaft 96. The knife 120 will also oscillate by virtue of drive being transmitted from the motor 114 to the disc 124 and via crank lever 122 so that the knife blade 120 is oscillated back and forth in the direction of double-headed arrow D in FIG. 7. As the bale is pushed towards the dispensing end 74 by the abutment frame 72, the bale will come into contact with the knife blade 120 which will slice the bale in half. Continued movement of the bale will cause the bale to engage the holding rods 176 which are spring biased in the direction of arrow E in FIG. 7 so that the sliced sections of the bale are pushed back against the bale slightly to hold them in place. Continued movement of the bale will push the holding rods 176 in a direction opposite arrow E so that the sliced bale which is still held by the rods 176 will move into the path of the rotating doffer elements 98 and wads of the sliced bale will be broken off the bale and will merely drop to the ground. Thus, as the bale is pushed forward the rods 176 will tend to hold the sliced bale intact until the doffer elements contact the bale and merely break off wads of the bale which then drop to the ground.

Should a binding or wire not be cut from the bale before the bale is moved by the frame 72 and the wires jam up with the knife blade 120, or should the mechanism otherwise fail, the movement of the bale towards the rear end will cause the rods 178 to move a greater distance in the direction opposite arrow E against the bias of the springs 175 and 160 so that the rods 178 comes into contact with the microswitches 172 which will cause the motor 114 to shut off and stop operation of the dispenser to prevent bending and breakage of components. The fault can then be rectified before the dispenser is again operated.

A battery (not shown) may be supported between frame members 28 and 38 for supplying power to the motor 114. The battery for activating the electric motor and hydraulic pump is connected in parallel via heavy duty connectors (not shown) and battery leads (not shown) to the towing vehicle battery. This allows a sharing of the heavy discharge that occurs when dispensing hay or silage and access to recharge from the towing vehicle generating system. Lights on the dispenser and the control switch (not shown) are powered through the conventional trailer pin and plug arrangement which is preferably a seven pin plug. A master switch (not shown) with a key is incorporated in the wiring system as a safety factor. When the master switch is turned on, feeding can be regulated by the control switch (not shown) that is mounted on the dashboard of the towing vehicle and is connected to the bale dispenser (10) through the normally unused contacts in the seven pin trailer plug and socket referred to above.

A housing 116 may be provided around the motor 114 for protecting the motor 114 and its associated output shafts 113 and 123 from contamination from loose hay or silage dispensed by the dispenser 10. A plate 127 (see FIG. 6) may also be provided for preventing loose hay or silage from coming into contact with the belt 104 and sprockets 102, 106 etc so they do not become clogged with loose hay or silage.

Manual control panel 240 is arranged at the forward end 73 of the dispenser 10 for operating the hydraulic rams 60 and 200 for loading on a bale onto the storage section 22 and transferring the stored bale onto the support member 20.

The motor 114 may be located within a housing 116 as best shown in FIGS. 5, 6 and 7 and a safety cage 150 may be provided about the knife 120 and doffer elements 98. The safety cage 150 can be opened by pivoting the safety cage 150 in a vertical direction as shown by arrow B in FIG. 6.

FIG. 8 shows a second embodiment of the invention and in particular to a different knife arrangement to that described with reference to FIGS. 1 to 7. FIG. 8 is similar to FIG. 5.

In FIG. 8, a stationary bar 250 is mounted vertically at the rear of the frame section 90. The bar 250 has a longitudinal groove 252 in which are supported a number of rollers or bearings 254.

An upper wheel 260 is mounted adjacent the top of the bar 250 and a second wheel 262 is mounted adjacent the bottom of the bar 250. Idler wheel 264 is mounted to the right of the frame 90 as seen in FIG. 8 on a suitable support frame member (not shown). A bandsaw 270 is guided about the roller wheels 260, 262 and 264 rides in the groove 252 of the bar 250 on the rollers or bearings 254.

Motor 114 is coupled to a right-angled gear box 280 shown schematically in FIG. 8 and the gear box 250 via a sprocket and chain arrangement (not shown) drives the wheel 262 so as to circulate the bandsaw 270 about the wheels 262, 264 and 260 with the bandsaw 270 being arranged in the groove 252 and supported by the bar 250 as it moves vertically from the roller 260 to the roller 262.

As a bale is forced past the bar 250, it is cut by the bandsaw 270 to slice the bale as disclosed in the earlier embodiments.

The arrangement of the knife of FIG. 8 which comprises the bandsaw portion extending between the rollers 260 and 262 and supported by the bar 250 enables a cutting knife to be provided which can be in the form of a saw or sawtooth arrangement which in general would be much sharper and less prone to blunting than a conventional knife as disclosed in the earlier embodiment. Thus, sharpening of the knife (which is formed by the bandsaw 270) of FIG. 8 is not required to the same extent as may be required with the knife blade of the previous embodiment.

In the embodiment described, the wads of hale or silage which are broken from the bale by the doffer elements 98 simply fall vertically to the ground so that as the vehicle 42 tows the dispenser 10, wads of hay or silage will be deposited along the path or roadway upon which the vehicle is driven. Thus, cattle can simply wander up behind the dispenser and eat the wads of hay or silage which are broken from the bale.

In very wet conditions it may be desirable to include a side delivery conveyor to deliver the doffed wads of hay or silage to a trough to the side of the dispenser rather than let the wads merely fall vertically so that the wads do not fall into churned up mud or the like which is created as the vehicle and dispenser move along a path or roadway.

The preferred embodiment of the invention enables wads of fodder to be delivered to the right and to the left in the form of discrete deposits rather than simply being churned out in a single unbroken line. As is best shown in FIG. 1, the two doffer elements 98 toward the upper edge of the page of FIG. 1 are 180' out of phase with respect to the two doffer elements 98 closer to the bottom of the page thereby causing the wads which are broken from the bale to be "staggered" as they fall to the left and to the right of the knife 120. The fact that feed is not broken out in a continuous unbroken line means that stock which tries to follow closely behind the dispenser 10 are less likely to trample the fodder into the ground. Furthermore, the holding rods 176 which hold the hay or silage after slicing of the bale restrain the hay or silage from free falling until the doffer elements displace the hay or silage. The gentle action of the rotating doffers which dispense the wads of hay or silage do so without threshing the leaves from the stems and therefore the preferred embodiment is particularly suited for dispensing lucerne hay which is particularly fragile in nature.

In the preferred embodiment of the invention as is made clear from the above description, the dispenser is in the form of a trailer and is equipped with necessary suspension, brakes and lights etc so that it may be towed by a road vehicle to service properties that might be separated by public roadways.

In the preferred embodiment of the invention a twelve volt battery is used to power a hydraulic pump. However, the hydraulic system could be powered by a small electric start combustion engine if desired. The general operating procedure for the dispenser is as follows.

To prepare for feeding;
 the hydraulic control is set for forward rotation of winch 180;
 cable 117 from the winch 180 is drawn around the abutment frame 72 and connected at point 74;
 hay bands on the bale of hay are cut and are secured to a suitable point on the front end of the dispenser 10 so that they do not interfere out of hay or silage;
 the master key in the master switch is turned on after checking that the control switch in the vehicle is turned off;
 the vehicle 42 and dispenser 10 are driven to where hay or silage is to be fed and the control switch in the vehicle is turned on and off to dispense fodder as is required.

To reload the storage section 22 from the towing vehicle 42:
 the section 32 of the storage platform 22 is unfolded to bridge the gap between the dispenser 10 and the towing vehicle;
 cable from winch 190 is drawn out and attached to a bale on the towing vehicle;
 the winch drum 190 is activated to draw in the cable; the master switch is turned on to start the motor and the winch will draw the bale onto the storage section until stopped by activating the microswitch at the end of the storage section 22; and
 the hydraulic control lever is briefly pushed to reverse the rotation of the winch drum 190 and this will release the tension on the cable so that it can be easily detached.

Since modifications within the spirit and scope of the invention may readily be effected by persons skilled within the art, it is to be understood that this invention is not limited to the particular embodiments described by way of example hereinabove.

While the invention has been specifically described in connection with certain specific embodiments thereof, it is to be understood that this is by way of illustration and not of limitation, and the scope of the appended claims should be construed as broadly as the prior art will permit.

The embodiments for which an exclusive property or privilege is claimed are defined as follows:

1. A bale dispenser for dispensing hay or silage from a bale, including:

a support member for supporting the bale; bale moving means for moving the bale on the support member towards a dispensing end of the support member; a cutting knife for slicing the bale longitudinally as the bale is moved towards the dispensing end of the support member; and doffer means downstream of the cutting knife for breaking wads of hay or silage from the sliced bale as the bale is moved towards the dispensing end of the support member.

2. The bale dispenser of claim 1, wherein the moving means comprises an abutment member guided for movement along the support member and for engaging the bale to thereby push the bale along the support member, and a cable for pulling the abutment member towards the dispensing end of the support member, and a winch for drawing in the cable to draw the abutment member and therefore the bale towards the dispensing end of the support member.

3. The bale dispenser of claim 2, wherein a hydraulic motor is provided for rotating the doffer means and also for powering winches for drawing in the cable for moving the abutment member and the winch for drawing a bale onto the storage section.

4. The bale dispenser of claim 2, wherein the support member comprises a support frame including tracks for guiding the abutment member along the support frame.

5. The bale dispenser of claim 2, wherein the cutting knife is arranged for vertical oscillating movement to slice the bale.

6. The bale dispenser of claim 5, wherein the knife is coupled to a crank lever for oscillating the knife in the generally vertical direction.

7. The bale dispenser of claim 5, wherein the doffer means comprises a plurality of doffer elements arranged for rotary movement downstream of the knife so that the bale is first sliced by the knife and the sliced portions of the bale are brought into the path of the doffer elements which break wads of hay or silage from the sliced bale as the doffer elements rotate.

8. The bale dispenser of claim 1, wherein the dispenser includes a storage section beside the support member for storing a bale of hay and bale positioning means for moving the stored bale of hay from the storage section onto the support member.

9. The bale dispenser of claim 8, wherein the positioning means comprises a pivotally mounted tipping section for movement out of the plane of the support section to tip the bale from the storage section onto the support member.

10. The bale dispenser of claim 8, wherein the storage section is tiltable in a vertical direction so that one end of the storage section can be raised to a suitable height for receiving a bale from a vehicle and then lowered to a storage and transport position.

11. The bale dispenser of claim 8, wherein bale drawing means is provided for drawing the bale onto the storage section.

12. The bale dispenser of claim 11, wherein the bale drawing means comprises a cable and winch arrangement so that the cable can be connected to the bale and the winch operated to pull the bale onto the storage section.

13. The bale dispenser of claim 1, wherein the dispenser has bale holding means at the dispensing end thereof for holding the sliced bale until the bale is struck by the doffer means to break wads of hay or silage from the sliced bale.

14. The bale dispenser of claim 1,
wherein the dispenser is in the form of a towable trailer having wheels and a drawbar for enabling the dispenser to be towed behind a vehicle.

15. The bale dispenser according to claim 1 wherein the cutting knife comprises a substantially vertically arranged portion of a bandsaw guided about a plurality of roller wheels and drive means for driving at least one of the roller wheels so as to circulate the bandsaw about the roller wheels.

16. A bale dispenser according to claim 1, including a storage section for receiving a bale for storage; and bale positioning means for moving the bale from the storage section onto the support member.

17. The bale dispenser of claim 16, wherein the positioning means comprises a pivotable frame member for pivotal movement out of the plane of the storage section for tipping the bale from the storage section onto the support member.

18. The bale dispenser of claim 16, wherein the dispensing means comprises a cutting knife and doffer means for breaking wads of hay or silage from a bale sliced by the knife as the bale is moved towards the dispensing end.

19. The bale dispenser of claim 16, wherein the storage section is tiltable so as to raise one end of the storage section to a convenient height for receiving a bale from a vehicle for loading of the bale from the vehicle onto the storage section.

* * * * *

UNITED STATES PATENT AND TRADEMARK OFFICE
CERTIFICATE OF CORRECTION

PATENT NO. : 5,984,217

DATED : November 16, 1999

INVENTOR(S) : James Arthur Commins

It is certified that error appears in the above-identified patent and that said Letters Patent is hereby corrected as shown below:

Column 7, line 60, change "hale" to --hay--.

Column 8, line 12, change "180'" to --180 degrees--.

Cancel Claim 18.

Signed and Sealed this

Sixth Day of June, 2000

*Attest:*

*Attesting Officer*

Q. TODD DICKINSON

*Director of Patents and Trademarks*